(12) United States Patent
Zhao

(10) Patent No.: US 9,771,020 B1
(45) Date of Patent: Sep. 26, 2017

(54) HAZARD TURN LIGHTS

(71) Applicant: Jian Jiang Zhao, Toronto (CA)

(72) Inventor: Jian Jiang Zhao, Toronto (CA)

( * ) Notice: Subject to any disclaimer, the term of this patent is extended or adjusted under 35 U.S.C. 154(b) by 0 days.

(21) Appl. No.: 14/999,045

(22) Filed: Mar. 23, 2016

(51) Int. Cl.
*B60Q 1/52* (2006.01)
*B60Q 1/34* (2006.01)

(52) U.S. Cl.
CPC ............... *B60Q 1/52* (2013.01); *B60Q 1/34* (2013.01)

(58) Field of Classification Search
CPC .. B60C 1/26; B60C 1/34; B60C 1/343; B60C 1/46; B60C 1/52
USPC ...................... 340/471, 475; 701/70; 180/271
See application file for complete search history.

(56) References Cited

U.S. PATENT DOCUMENTS

| 4,087,784 A | 5/1978 | West |
| 4,302,748 A | 11/1981 | Gant |
| 4,896,251 A | 1/1990 | Fazel et al. |
| 6,069,559 A | 5/2000 | Davis et al. |
| 6,181,243 B1 * | 1/2001 | Yang ............. B60Q 1/302 340/468 |
| 6,693,526 B1 * | 2/2004 | Puccio ............. B60Q 1/44 340/479 |
| 8,106,760 B2 | 1/2012 | Ekchian et al. |
| 2007/0120655 A1 | 5/2007 | Lahr et al. |
| 2007/0132573 A1 | 6/2007 | Quach et al. |

* cited by examiner

Primary Examiner — Thomas Mullen

(57) ABSTRACT

An emergency turn signal system for vehicles having brake lights with a rear central brake light, and having left and right turn signals, and having a hazard flasher light control operable to cut out the turn signal control, and cause the turn signal lights to flash on and off, and having left and right rear emergency turn signals and an emergency turn signal switch, connected to a power source independently of said hazard flasher, and having right and left wiring connected to the emergency turn signal switch; right and left turn signal light modules along side the rear central brake light having respective right and left bulbs connected to respective right and left wiring from the emergency turn signal switch.

7 Claims, 1 Drawing Sheet

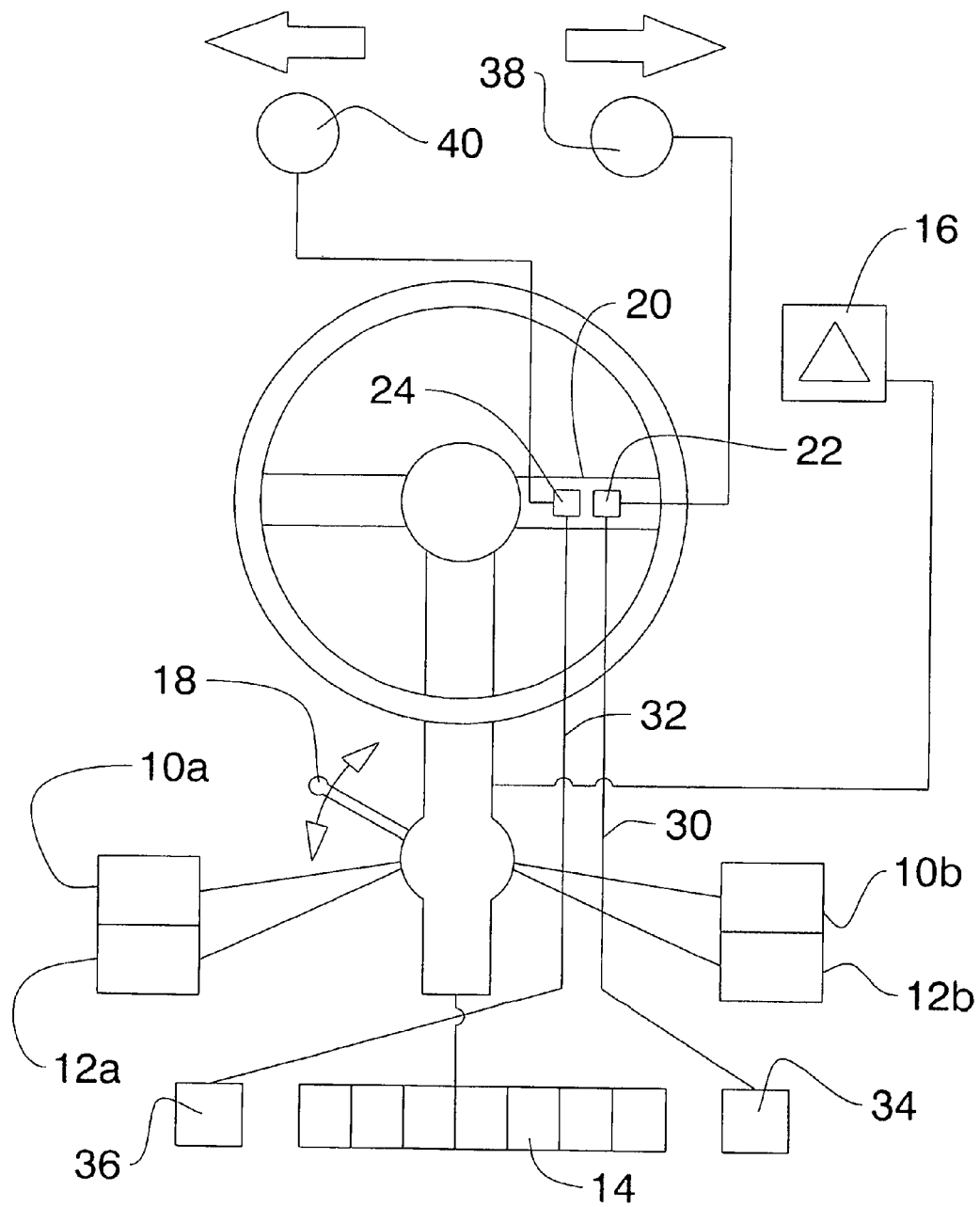

HAZARD TURN LIGHTS

FIELD OF THE INVENTION

The invention relates to vehicle hazard warning lights, and in particular to emergency turn signal lights which give warning of an impending emergency turn or lane change, even though the vehicle hazard lights have been activated.

BACKGROUND OF THE INVENTION

Vehicles have been equipped with hazard warning lights for some time past. These hazard lights are operated by a dashboard control switch.

Operation of the conventional hazard switch will cause the conventional turn signals, in most cases, to flash simultaneously. In the case of a hazard the light are controlled by a hazard flasher light switch system. The hazard flasher and light switch are independent of the switches for the turn signals and overides them.

Usually the hazard lights are activated by the driver after the vehicle has come to a stop. When activated lights then flash on and off. If the vehicle (or the driver) develops a hazard while driving on the highway, the vehicle may come to a stop in a driving lane. This will cause a sudden emergency whether or not the hazard lights have been activated, and the vehicle will block a lane of traffic. This creates a dangerous situation. Flashing the hazard lights, alone, will not make the situation less hazardous, for the vehicle and driver, or for the traffic around it.

Preferably the vehicle (or driver) in trouble should move out of the traffic, onto the side of the road, thus leaving the driving lanes clear. This manoeuver, if the vehicle is controllable at all, can be difficult in heavy traffic, especially bearing in mind that it must be done after the hazard situation has arisen, when the driver may have difficulty controlling the vehicle, or the driver may become panicked or disoriented. The driver may feel that moving over a lane and attempting to leave the road creates a hazard in itself. The regular turn signals will not work, once the hazard flasher is activated. However, a vehicle in trouble may have no choice but to make such a lane change to get out of the traffic for its own safety and that of the passengers, and this may be an abrupt, unplanned move.

Indicating such a lane change with the conventional turn signals after the hazard lights have been activated, will be impossible. The hazard warning flasher overrides the turn signal control, since the hazard system flashes both lights simultaneously.

Thus the driver of a vehicle which is in trouble and who first activates the hazard lights, while driving, is prevented from being able to use the turn signals to indicate a turn or lane change, since the activation of the hazard lights cuts out the turn signal control. Clearly it is desirable to provide the driver with the option of being able to activate first the hazard lights in the conventional way, and then operate an emergency turn signal, or hazard turn light, indicating a turn or lane change in spite of the existing operation of the hazard light flasher. For many years, most vehicles are equipped with a third rear brake light usually mounted centrally on the back of the vehicle, and usually at a higher elevation than the side brake lights and turn signal lights.

BRIEF SUMMARY OF THE INVENTION

With a view to achieving these objectives the invention comprises an emergency turn signal system or hazard turn lights, for vehicles having brake lights with a central rear stop light, and the usual turn signals, and having a hazard flasher light control operable to cut out the turn signal control, and cause lights to flash on and off on both sides of the vehicle, and having an emergency turn signal switch with power, and right and left wiring connected to the emergency light turn signal switch, and right and left emergency light modules adjacent to the central rear stop light connected to respective right and left wiring from the emergency turn signal switch, and having emergency turn signal right and left indicator lights in the driving compartment of the vehicle, connected to the right and left hand wiring from the emergency turn signal switch and operable to provide an indication to the driver that he has activated the emergency turn signal light.

Preferably the emergency turn signal switch is mounted adjacent to the drivers controls, such as on the steering column of the vehicle, or on the dashboard, accessible to the driver.

Preferably the emergency turn signal switch consists of a switch module with right and left switch buttons, connected to respective right and left wiring.

Preferably the emergency turn signal will have its own flash control, separate from the conventional hazard flasher, so that the emergency turn signal will act like a turn signal light.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 1 is a schematic circuit diagram showing the usual wiring for the left and right rear vehicle lights, and the rear central brake light, and showing emergency turn signal modules, and the separate left and right wiring for the emergency turn signal lights and left and right switch buttons to control such emergency turn signal lights.

DESCRIPTION OF A SPECIFIC EMBODIMENT

Referring first to FIG. 1 it will be seen that a typical vehicle at its rear is equipped with the usual right and left rear side brake lights modules (10a) and (10b) and respective right and left turn signal lights (12a) and (12b). Usually the vehicle will have a central upper rear stop light (14).

Such conventional lights are all wired to their respective usual vehicle switch systems (not shown) the details of which may vary from one vehicle to another. In most vehicles the conventional left and right rear lights, are also wired to a conventional hazard flasher circuit (16). The conventional hazard flasher circuit (16) is usually controlled by a manual control button on the dashboard of the vehicle. This button is conventional and is not shown. The brake lights (10a and 10b) are connected to a brake pedal (not shown), and turn signal lights (12a and 12b) are connected in the usual way to a conventional turn signal control (18), which require no description. Depending on the make and design of the vehicle they may be subject to the conventional hazard flasher override.

Once the hazard flasher is activated, it operates the lights on and off continuously, until switched off. The hazard flasher overrides the regular switches for some of the standard vehicle lights. In particular, the regular vehicle rear turn signals are overridden, and no longer respond to operation of the conventional vehicle turn signal switch.

The invention provides an emergency turn signal system consisting of an emergency turn signal module (20) mounted in the driving compartment convenient to the driver, for example on the steering column. It is shown in this embodiment as being mounted on a spoke of the steering wheel. The module (20) has left and right signal buttons (22) and (24). The module is supplied with power through internal circuits, independent of the hazard flasher circuit (16).

From the emergency turn signal module (20), right and left hand wiring (30) and (32) leads to either side of the central rear mounted brake light unit (14). The wiring is connected to suitable right and left turn signal modules (34) and (36). These modules have appropriate lenses (not shown) so that when one module is activated, the signal will alert vehicles behind of the intentions of the vehicle in trouble.

The invention provides respective right and left switch buttons (22) and (24). The system also provides right and left indicator lights (38) and (40), in the driving compartment, visible to the driver. These indicator lights are wired to the module (20). Module (20) will of course be connected to a power source, independently of the hazard flasher (16). One or other indicator light will flash, when the respective emergency turn signal switch is activated.

This will give the driver an indication that the emergency turn signal system is working.

The wiring can be fitted during manufacture of the vehicle, in many cases. However, the invention is also adaptable to being fitted by a dealer, in a new or an existing vehicle, as part of after-market service. The emergency turn signal module can be attached to the steering column, by any suitable clamp (not shown).

In some cases emergency turn signal bulbs, and sockets, can be added inside the central brake light module (14), but will preferably be added as separate modules alongside the central brake light, on right and left hand sides. The right and left wiring (30) and (32) can be run inside the vehicle passenger compartment, connecting the right and left hand switch buttons, to their respective right and left bulb sockets, and to the indicator lights in the driving compartment.

The power supply for the emergency turn signal module can be connected by a dealer to access power independently of the hazard flasher circuit (16).

In use, assuming a hazard has arisen, such as a blown tire, for example, the driver would usually activate the hazard flasher.

The driver, assuming he still has sufficient control of the vehicle, will then press one of the emergency turn signal buttons (22) or (24), indicating a lane change. Usually, except in countries using the left hand lanes, the lane change would be to the right, so that the driver, eventually, can exit the highway onto the road side. There may be cases where he would wish to exit to the left, hoping to find space on the left side of the highway.

Once the selected emergency turn signal button is pressed the respective emergency turn signal light, (36) or (34) will flash on and off continuously, alongside the central rear brake light, indicating a turn or lane change.

It will also activate the respective one of the interior indicator lights. This will give the driver an indication that the emergency turn signal system is working.

The foregoing is a description of a preferred embodiment of the invention which is given here by way of example only.

The invention is not to be taken as limited to any of the specific features as described, but comprehends all such variations thereof as come within the scope of the appended claims.

What is claimed is:

1. An emergency turn signal light system for indicating an emergency turn for vehicles having brake lights, and conventional turn signals and controls, and having a conventional hazard flasher light control operable to disable the conventional turn signal control, and cause at least the conventional turn signals on both sides of the vehicle to flash on and off, and comprising:
    an emergency turn signal switch module accessible to the driver, and connected to a source of power independently of said conventional hazard flasher light control which can be operated by the driver while driving the vehicle independently of the conventional hazard flasher light control and being operable to send emergency turn signal commands when the emergency turn signal switch module is activated by the driver;
    right and left rear emergency turn light signals on respective right and left sides of the vehicle;
    emergency turn signal switch controls on said emergency turn signal switch module which are operable to selectively activate one or the other of said right and left rear emergency turn light signals; and,
    right and left wiring connected to the emergency turn signal switch and connected to the respective right and left rear emergency turn light signals to send an emergency signal command signal from said emergency turn signal switch module to a selected one of said emergency right and left turn light signals.

2. The emergency turn signal light system for vehicles as claimed in claim 1 wherein said emergency turn signal switch module is mounted adjacent to the steering column of the vehicle and accessible to the driver for operation by the driver while the vehicle is still being driven.

3. The emergency turn signals light system for vehicles as claimed in claim 2 wherein said emergency turn signal switch module controls includes respective right and left switch buttons, connected to respective right and left wiring, which may be selectively operated by the driver to indicate either a right or a left turn in an emergency.

4. The emergency turn signal light system for vehicles as claimed in claim 3 and including right and left indicator lights, mounted in the driving compartment of said vehicle and connected to said emergency turn signal switch module, and which will be selectively operated by one or the other of said right and left switch buttons to indicate to the driver operation of a respective emergency turn light signal.

5. The emergency turn signal light system for vehicles as claimed in claim 4 including an emergency flasher circuit connected to said emergency turn signal switch module, and operable when the driver selects one or the other of said emergency turn signal buttons independently of said conventional hazard flasher light control.

6. The emergency turn signal light system for vehicles as claimed in claim 1 wherein said right and left rear emergency turn light signals are incorporated in separate right and left hand light modules.

7. The emergency turn signal light system for vehicles as claimed in claim 1 wherein there is a central rear brake light module in said vehicle, and wherein said right and left rear emergency turn light signals are incorporated in said central rear brake light module.

* * * * *